(12) United States Patent
Padmanabhan et al.

(10) Patent No.: US 10,635,461 B2
(45) Date of Patent: Apr. 28, 2020

(54) COMPUTER-AIDED INTERACTIVE LEARNING

(71) Applicant: Dassault Systemes SolidWorks Corporation, Waltham, MA (US)

(72) Inventors: Hari Padmanabhan, Acton, MA (US); Amina M. Roderick, Portsmouth, NH (US)

(73) Assignee: Dassault Systemes SolidWorks Corporation, Waltham, MA (US)

( * ) Notice: Subject to any disclaimer, the term of this patent is extended or adjusted under 35 U.S.C. 154(b) by 369 days.

(21) Appl. No.: 15/424,633

(22) Filed: Feb. 3, 2017

(65) Prior Publication Data

US 2018/0225130 A1 Aug. 9, 2018

(51) Int. Cl.
*G06F 9/451* (2018.01)
*G06F 3/0481* (2013.01)
*G06F 3/0484* (2013.01)

(52) U.S. Cl.
CPC ............ *G06F 9/453* (2018.02); *G06F 3/0481* (2013.01); *G06F 3/04842* (2013.01)

(58) Field of Classification Search
CPC .... G06F 9/453; G06F 3/0481; G06F 3/04842; G09B 5/00
See application file for complete search history.

(56) References Cited

U.S. PATENT DOCUMENTS

| | | | | |
|---|---|---|---|---|
| 6,968,505 B2* | 11/2005 | Stoll | ................ | G06F 9/453 715/712 |
| 7,000,187 B2* | 2/2006 | Messinger | .............. | G06F 9/453 715/705 |
| 7,640,548 B1* | 12/2009 | Yu | .......................... | G06Q 10/10 718/106 |
| 7,877,686 B2* | 1/2011 | Abbott | ................. | G06Q 10/109 715/708 |
| 2005/0138559 A1* | 6/2005 | Santos-Gomez | ....... | G06F 9/453 715/709 |
| 2007/0027733 A1* | 2/2007 | Bolle | .................... | G06F 19/321 705/7.13 |
| 2009/0083710 A1* | 3/2009 | Best | ........................ | G09B 5/00 717/120 |
| 2012/0110451 A1* | 5/2012 | He | .......................... | G06F 9/453 715/709 |
| 2012/0304060 A1* | 11/2012 | Kompalli | ................. | G06K 9/00 715/709 |
| 2014/0115459 A1* | 4/2014 | Norwood | ............. | G06F 3/0484 715/708 |

* cited by examiner

*Primary Examiner* — Andrew L Tank
(74) *Attorney, Agent, or Firm* — Hamilton, Brook, Smith & Reynolds, P.C.

(57) ABSTRACT

A computer-implemented method and system creates an interactive learning environment. Windows are created for guiding a user through a series of steps to perform a task supported by a computer software application. The windows contain textual and/or visual content that informs the user of the elements to accomplish the task. At least one of the windows contains a pointer indicating a location of a command in a user interface of the computer software application. User interaction is enabled during the execution of the series of steps, allowing for user input.

20 Claims, 10 Drawing Sheets

COMPUTER-AIDED INTERACTIVE LEARNING

BACKGROUND OF THE INVENTION

Computer software applications provide ways in which a user can obtain assistance in learning and using a particular software application. Most software applications have help systems that include search mechanisms where a user types in one or more text strings and the software finds a reference to the text string(s) in a database of help files. The search results are then displayed and the user may select a result and read the content of the respective help file or portion thereof. Generally, help topics inform the user how to use each command or a user interface (UI) object. A dialog box may be used to display the help information. Additionally, the information may contain links to further information on a relevant topic. A disadvantage of this approach is that information on why the user should use the command or user interface object is often lacking. Furthermore, the practical and/or technical application behind why one should use this tool is often lacking from this approach as well.

Another form of help is a tooltip. Tooltips describe what an option does. As an example, when a user hovers a mouse cursor over an item in a dialog box a tooltip may tell the user what the option is intended to do. However, the tooltip may not answer the question why the option should be used.

Tutorials may also be available in state-of-the-art computer applications. Tutorials may show what step to take by, for example, causing a command to blink. However, tutorials do not necessarily inform the user which steps need be taken within the command to complete the command successfully.

A tutorial may take the form of a video published on the Internet. The problem with the approach of capturing video is that UI text may differ in each supported language. Additionally, any minor updates applied in the UI has an impact and updating the video to match the updated UI would be needed. Thus, keeping a video that resides at an Internet location up-to-date is a drawback.

User interface wizards also assist users in preforming tasks. UI wizards lead a user through a series of steps using a series of dialog boxes. UI wizards may also perform certain steps for the user and select certain options (e.g., a directory to store downloaded files). When a user is presented with a UI wizard, the user does not learn where the commands are located in the UI because the UI wizard may open one or more commands for the user, for example. Thus, the next time the user wants to use the command he or she may not know where the command is located in the UI.

Another type of help available is a note that pops up on a computer display. Some notes may fade away after a period of time; other notes may persist until a user affirmatively closes the respective note. For example, an implementation of a note may allow a user to click on the note and step to the next note. Examples of this are the Hopscotch product tour where a note hops around the computer screen, as shown at http://linkedin.github.io/hopscotch/. A drawback with notes as described is that a user cannot execute commands and follow a workflow.

A system and method that creates an interactively learning environment that engages a user and addresses the foregoing drawbacks would be an improvement over current state-of-the-art software systems and beneficial to users' learning experience.

SUMMARY OF THE INVENTION

Embodiments of the present invention address the foregoing shortcomings and disadvantages of the art. In general, in one aspect, embodiments of the present invention feature computer-implemented methods for creating an interactive learning environment. Such methods include creating windows for guiding a user through a series of steps to accomplish a task supported by a computer software application. At least one of the windows contains a pointer indicating a location of a command in a user interface of the computer software application. User interaction is enabled during the execution of the series of steps and may be in the form of user input specified in one of the windows. Further embodiments include executing the command upon user selection of the command.

Yet other embodiments include a subset of the windows used by the computer software application when the interactive learning environment is not active, and use of the subset of the windows while the interactive learning environment is active provides training for the use of the subset of the windows when the interactive learning environment is not active.

In further embodiments, the task is at least partially accomplished by selection of an option in a pull-down menu, the visual content is a video sequence demonstrating one or more user interactions to perform the task, and which of the windows are displayed on a computer screen and removed from the computer screen depend on which of the series of steps is currently executing.

Embodiments also feature using data generated as a result of selection of the option as input to an interactive learning function causing the interactive learning environment to determine subsequent sequences of the series of steps.

Additional embodiments include a non-transitory computer-readable data storage medium comprising instructions and a computer system having a processor configured with instructions, the instructions causing the computer to create an interactive learning environment having windows that guide a user through a series of steps to perform a task supported by a computer software application. The windows may contain textual and/or visual content informing the user of elements to accomplish the task. At least one of the windows contains a pointer indicating a location of a command in a user interface of the computer software application. User interaction is enabled during the execution of the series of steps, and user interaction takes a form of a user input specified in one of the plurality of windows. The command may also be selected by the user resulting in the execution of the command. The windows may have user interface buttons that when selected advances a learning sequence to a next step in the series of steps of sets the learning sequence to a previous step in the series of steps.

The details of one or more embodiments of the invention are set forth in the accompanying drawings and the description that follows. Other features, objects, and advantages of the invention will be apparent from the description and drawings, and from the claims.

BRIEF DESCRIPTION OF THE DRAWINGS

The foregoing will be apparent from the following more particular description of example embodiments of the invention, as illustrated in the accompanying drawings in which like reference characters refer to the same objects throughout the different views. The drawings are not necessarily to scale, emphasis instead being placed upon illustrating embodiments of the present invention.

DETAILED DESCRIPTION OF THE INVENTION

The present invention creates an interactive learning tool that engages a user in the process of learning a software application. The invention may be used to spur the user into utilizing complex techniques and grasping complicated concepts during the early stages of learning a software application. The interactive learning tool shows user how to go through various steps to perform an operation and teaches technical and practical aspects of an operation, including why the steps are performed. The operations performed may require fairly simply techniques or rather complex techniques.

As an example of complex techniques and complicated concepts that may be taught to a user using the present invention consider an embodiment implemented in a computer-aided design and engineering software application. When beginning a new design or re-designing one or more existing part models, the present invention may be utilized to guide the user through the execution of complex tasks. One such complex task is conducting a simulation of an assembly of parts.

Generally, engineering training is required to carry out software simulation tasks. The user must set up a problem and the software arrives at a shape or design based on one or more functions (e.g., loads and boundary conditions). A user of a computer-aided design and engineering software application may have limited experience in simulating an engineering design, however. Sometimes, users are unsure of all the steps needed to run a successful simulation process and do not fully grasp the concepts behind properly setting up a simulation study. The present invention addresses these short comings by providing a step-by-step guide showing the user the necessary actions needed to complete and run the simulation.

The present invention not only describes via visual and textual content the tasks to perform, but also uses pointers to focus the user's attention on the commands that need to be selected, data that needs to be entered, etc., in order to complete a task. Additionally, the content teaches the fundamentals with regards to accomplishing a task. The user responds to the guidance given by the present invention and thereby learns and benefits by understanding overall concepts and necessary steps that can be applied to other problems and/or in other contexts.

The present invention enables depictions of a workflow to be shown to the user. The depictions illustrate the workflow to solve a problem and assists the user in utilizing concepts and workflow to solve his or her own problem. The depictions show the user the location of the command in the user interface and guide the user via step-by-step instructions to complete the command successfully.

Figure 1:
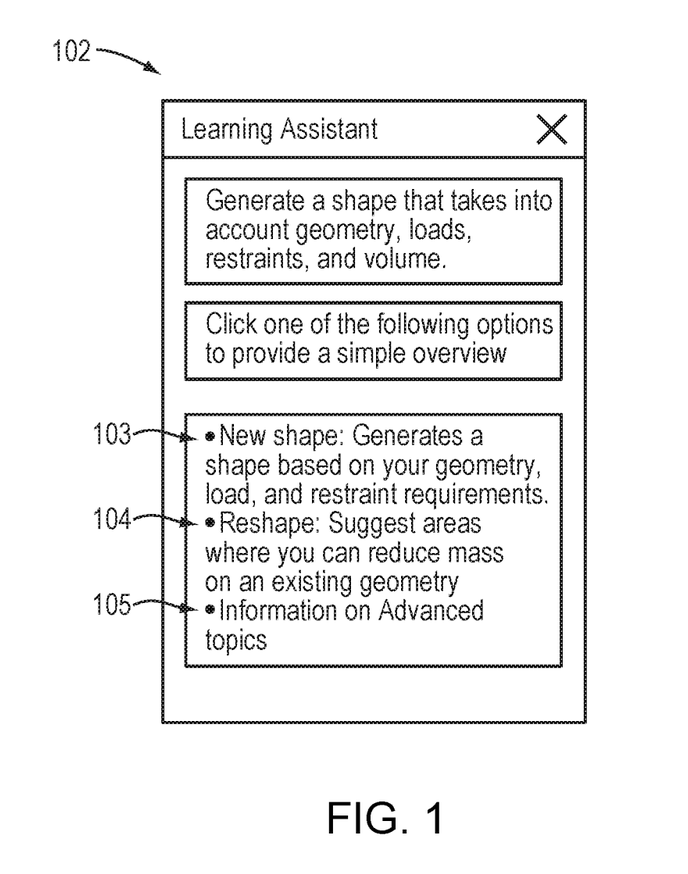
FIG. 1 is an illustration of a user interface dialog in an embodiment of the present invention.

FIG. 1 illustrates an initial dialog 102 displayed for a learning assistant process for generating a shape in an embodiment of the present invention. As noted in initial dialog 102, generating a shape takes into account geometry, loads, restraints, and volume. The user is instructed to select one of three options 103, 104, and 105 for an overview on the topic.

Figure 2:
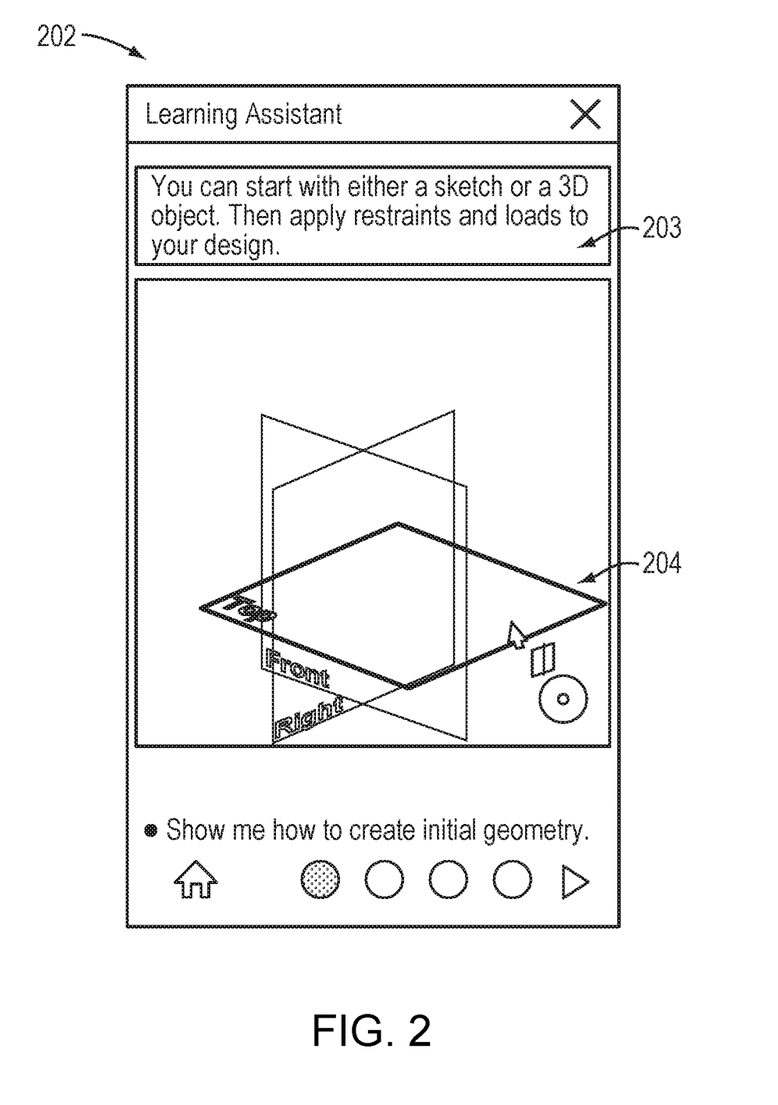
FIG. 2 is an illustration of a user interface dialog in an embodiment of the present invention.

FIG. 2 illustrates a second learning assistant dialog 202, which is displayed after the user selects the first option 103 from the initial dialog 102 to create a new shape. The second learning assistant dialog 202 includes a description of the next steps 203 informing the user that the user may start with a sketch or a 3D object then add restraints and loads. The second learning assistant dialog 202 also shows the initial steps in creating a new shape, including a video sequence that displays top, front, and right planes and the selection of the top plane 204 on which a 2D sketch of an object may be created.

Figure 3:
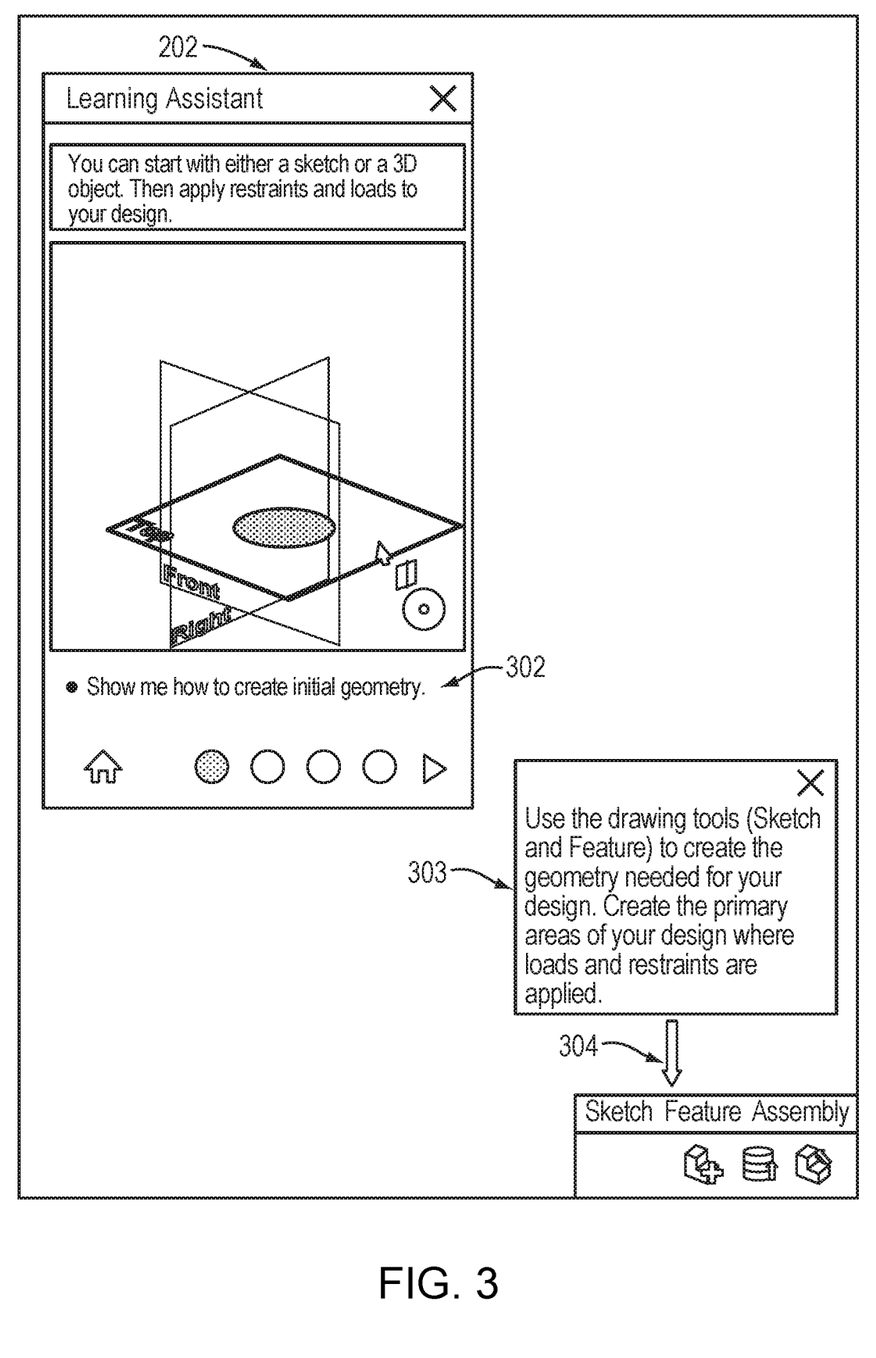
FIG. 3 is an illustration of two user interface dialogs in an embodiment of the present invention.

Referring now to FIG. 3, the user selected the option "Show me how to create initial geometry" 302. A UI dialog 303 describes that a drawing tool should be used and an arrow 304 extends from the UI dialog 303 to show the user where such a tool is located. The user may select the drawing tool, at which point the user may create a sketch independently of the learning assistant process.

Figure 4:
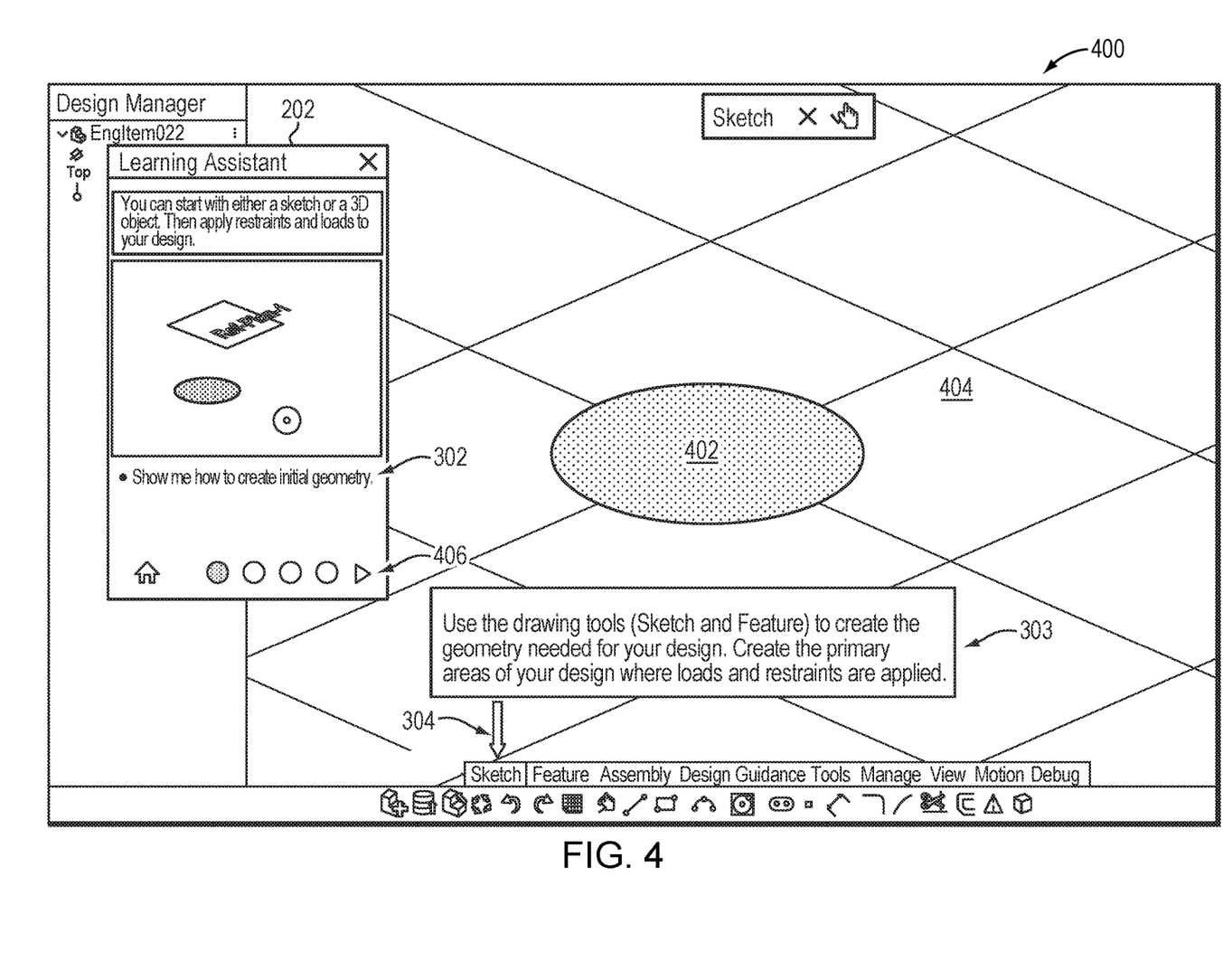
FIG. 4 is an illustration of user interface dialogs during an interactive learning session in an embodiment of the present invention.

FIG. 4 shows an embodiment of the present invention in which the user is interacting with the software application while the learning assistant process continues to demonstrate the creation of the shape. The user may create an object 402 in the modeling area 404 of the application window 400. As shown in FIG. 4, the object 402 resembles the shape depicted in the second learning assistant dialog 202. The user may continue to model an object at the same time being instructed on how to do so by the second learning assistant dialog 202. When the user is ready to move on to the next step, the right arrow 406 is selected, after which the next step is displayed in the second learning assistant dialog 202, as shown in FIG. 5.

Figure 5:
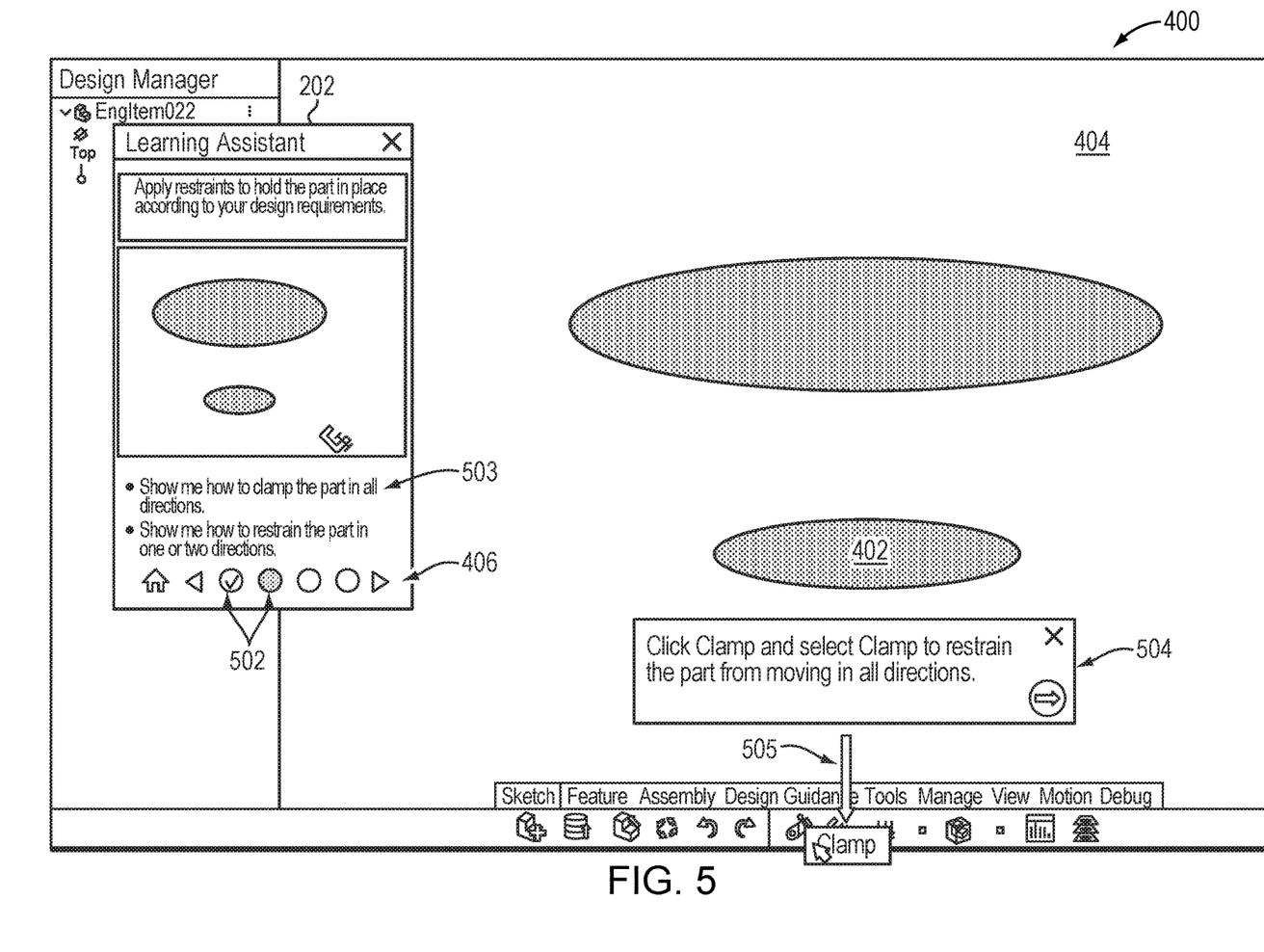
FIG. 5 is an illustration of an interactive learning session in an embodiment of the present invention.

FIG. 5 illustrates the next step in the learning assistant process. Visual feedback of the next step is giving utilizing buttons 502. The first of buttons 502 is checked to indicate that the first step is completed. The second of buttons 502 is filled in to indicate that the second step is the active step for the learning assistant process. In the second step the user has selected the first option 503 to show how to clamp the part in all directions. Another UI dialog 504 is displayed, indicating to the user with an arrow 505 what command to select for the clamping operation and the location of the command.

Figure 6:
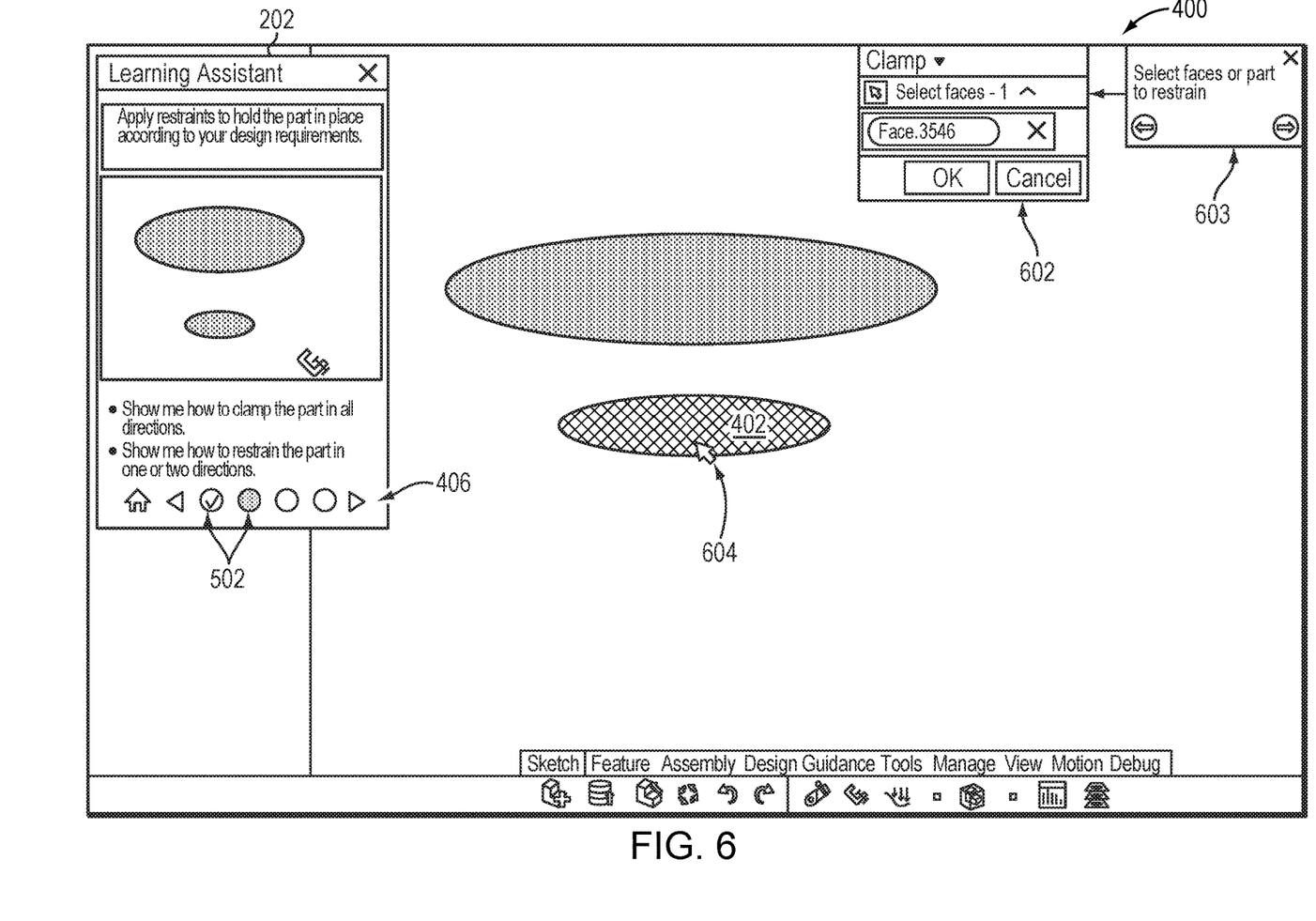
FIG. 6 is an illustration of an interactive learning session in an embodiment of the present invention.

Referring now to FIG. 6, the user has selected the clamp tool pointed to by arrow 505 in FIG. 5. Two dialogs appear in the window 400. A first dialog box 602 has a data entry field used to specify the faces of the part to restrain as the user is informed via the second dialog box 604. The user has selected a face of object 402 with a cursor 604. FIG. 6 illustrates the interaction between the learning assistant process and user input needed to execute a command in the software application in which the learning assistant is assisting the user. Thus, the present invention enables the user to initiate the execution of commands and follow a workflow guided by the learning assistant.

Figure 7:
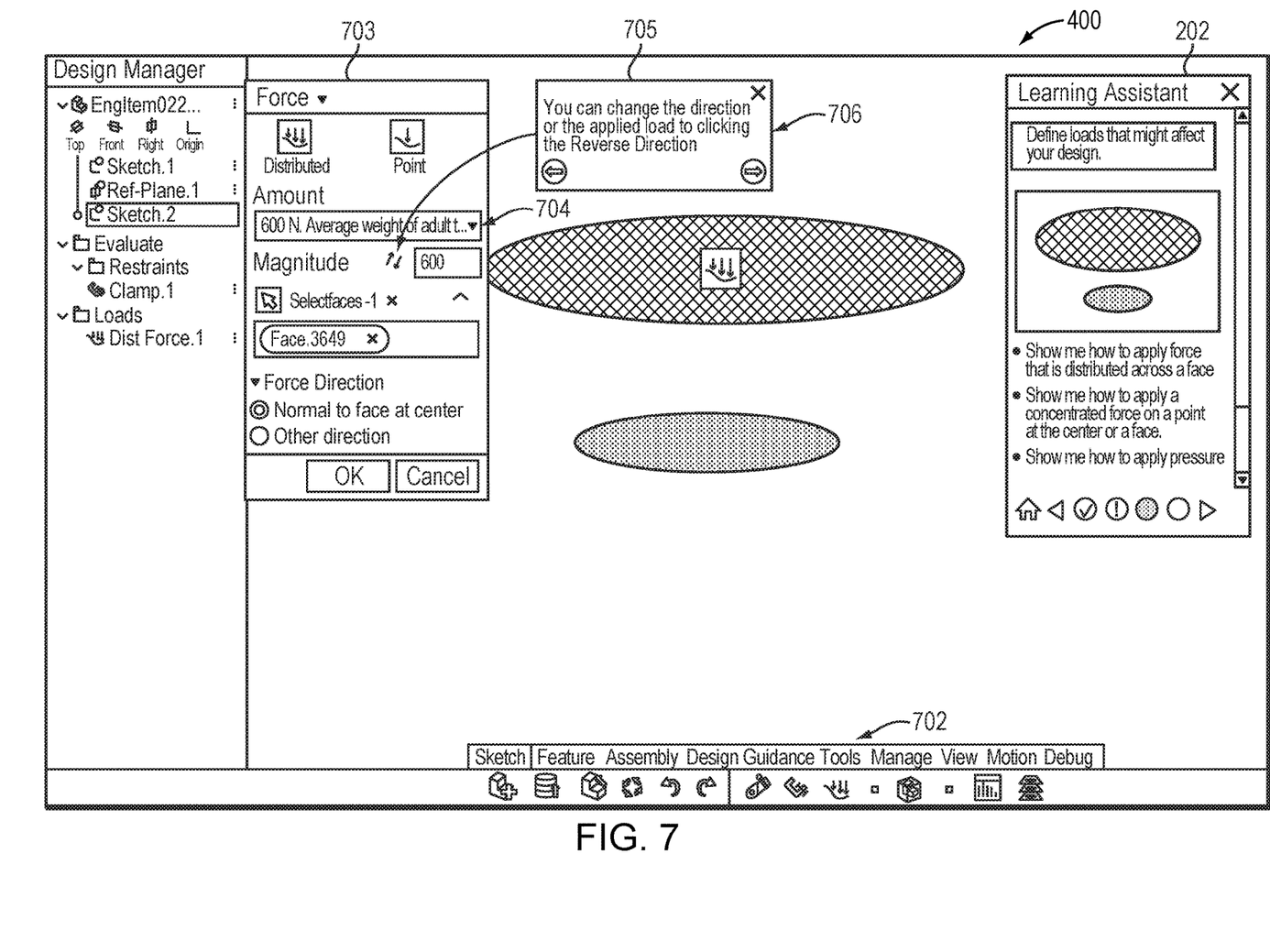
FIG. 7 is an illustration of an interactive learning session in an embodiment of the present invention.

FIG. 7 also illustrates the present invention enabling a user to interact with an application under the guidance of a learning assistant. In FIG. 7, the learning assistant dialog 202 prompted the user to allow the present invention to show how to apply a force. The user elected to do so and after the learning assistant process pointed to the force command 702 (executed in the same manner as has been previously discussed using a UI dialog box pointing to a command), a force dialog 703 is displayed for specifying parameters. One chosen parameter is a load in the amount of 600 Newtons selected and entered in the data entry field 704 after a learning assistant dialog 705 has prompted the user to choose a load amount from a pull-down menu. The user may then press the right arrow button 706 to initiate an instruction to the learning assistant tool to advance the learning assistant dialog 705 to the next information dialog, which informs the user that the direction of the force may be changed by selecting the direction button pointed to by the learning assistant dialog 705 in FIG. 7. Likewise, pressing a left arrow button on the learning assistant dialog 705 resets the information dialog to a previous step.

Another aspect of the present invention is the customization of a learning experience. As an example, text displayed for pull-down options may be meaningful for a particular installation. In the force dialog 703 the text that describes a force for a pull-down menu option may be "0.5 N: Force to press a key on a keyboard" or "600 N: Average weight of a human." Customization may be allowed via enabling a system administrator to write a Java script that is accessed and processed by the interactive learning tool or use APIs to write meaningful text strings to be processed by the interactive learning tool.

Figure 8:
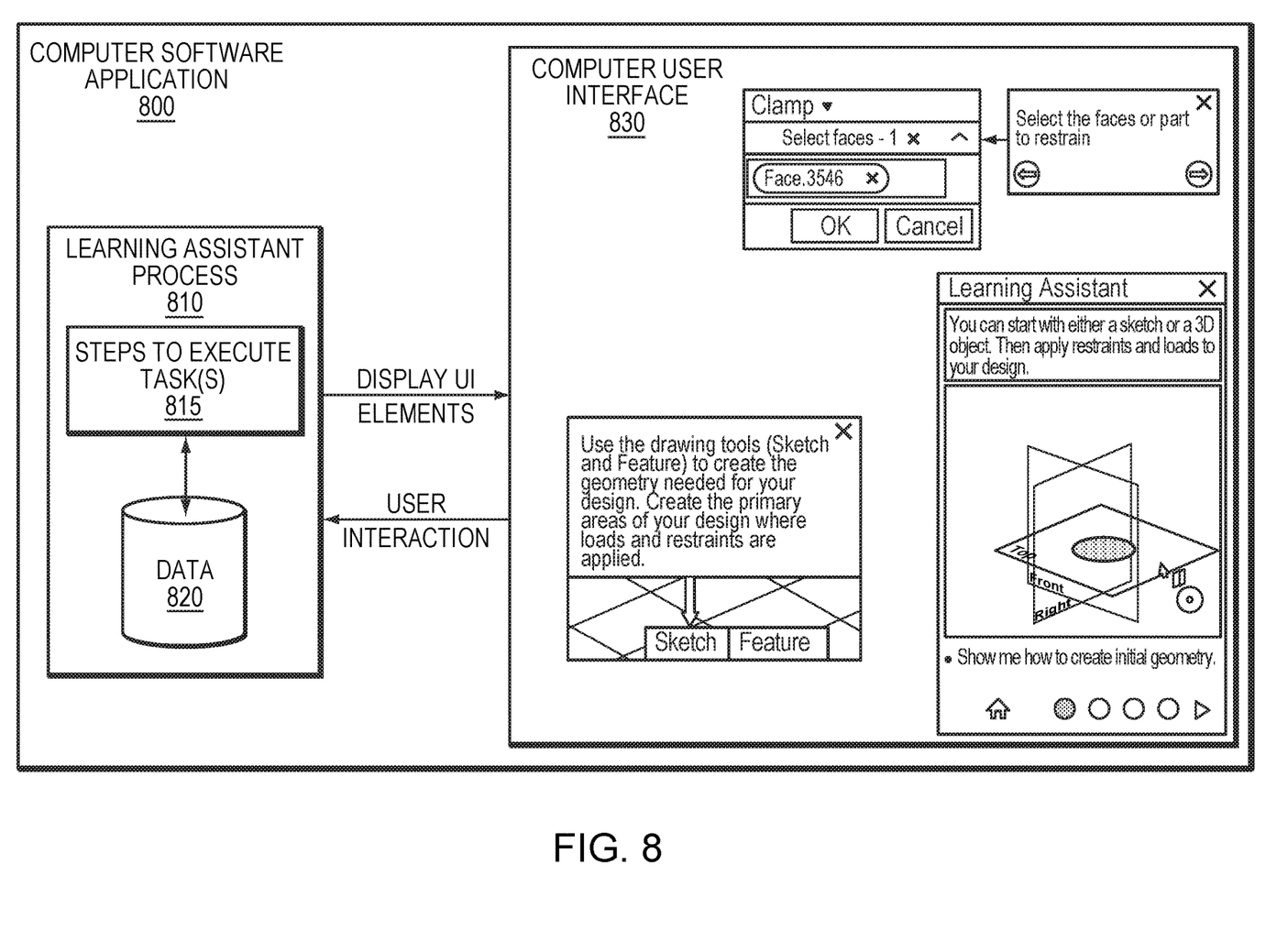
FIG. 8 is a schematic diagram of an embodiment of the present invention.

Referring now to FIG. 8, a schematic diagram of an embodiment of the present invention is illustrated. A computer software application 800 comprises a learning assistant process 810 and a computer user interface 830. Arrows depicted in FIG. 8 indicate an exchange of data in the form of displaying user interface elements and the transfer of user interaction data between the learning assistant process 810 and the computer user interface 830. The learning assistant process 810 includes steps to execute one or more tasks 815 using the computer software application 800, and data 820 used to complete the tasks. Those skilled in the art may easily create step-by-step instructional content and display that content within a software application such that input from a user may be accepted in response to the displayed content and processed to affect a next step in the step-by-step instructional content.

The present invention has been described with respect to a computer-aided design and engineering application although applicable to other types of software applications. That is, workflows other than in computer-aided design and engineering applications can benefit by applying the present invention to assisted learning in other disciplines.

Advantages of the present invention include providing an interactive assisted learning experience within a software application. The interactive experience displays dialogs in a user interface where the dialogs contain content informing the user how to perform a task and why to perform task. The interactive experience allows a user to supply parameters and thereby directly affect the result of an interactive learning session. Importantly, the present invention provides a dynamic learning experience within a computer software application in contrast to other systems that, for example, display static help tips that appear and disappear when a cursor hovers over a UI area and dialogs separate from a software application that contain help information, and sometimes links to further information.

Computer Support

Figure 9:
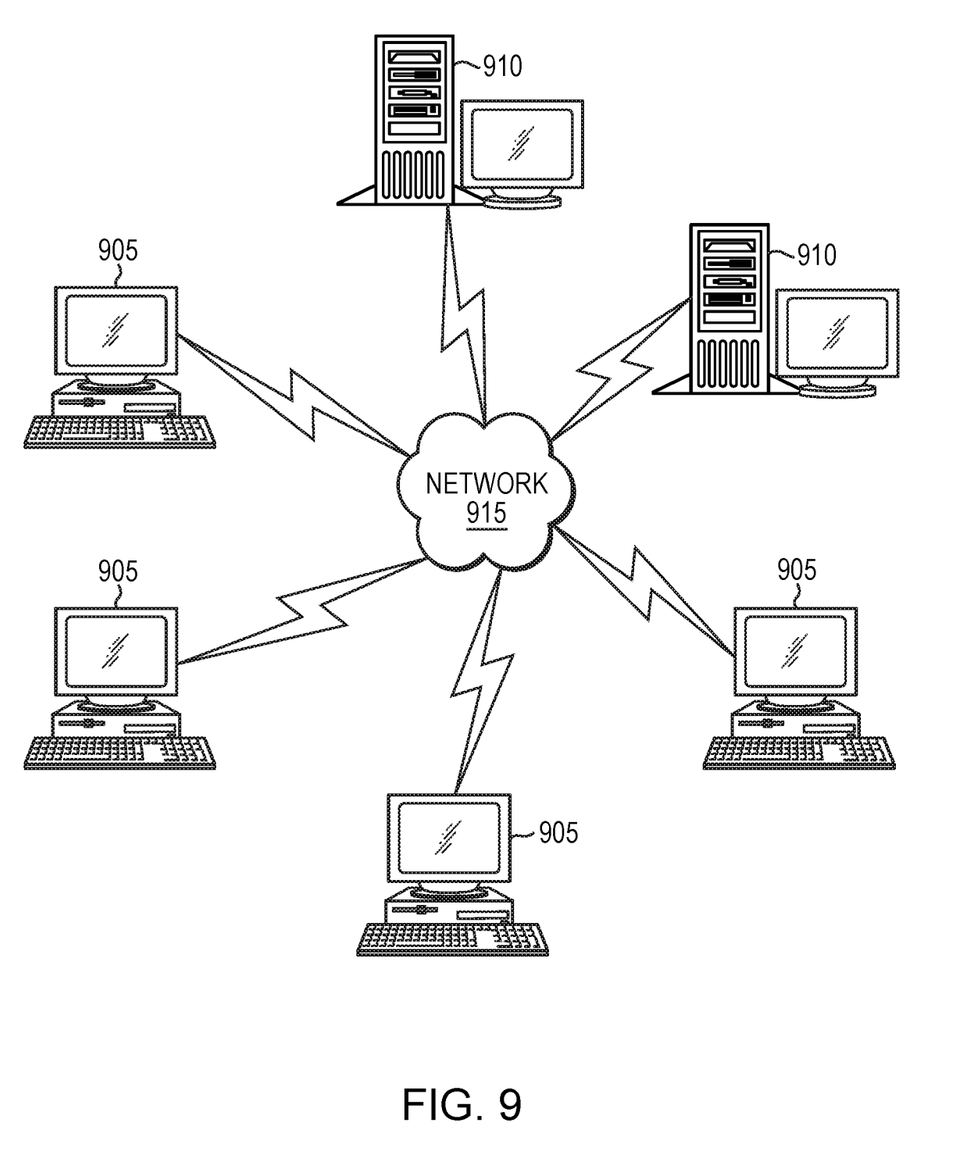
FIG. 9 is a schematic diagram of a computer system network embodying the present invention.

FIG. 9 illustrates a computer network or similar digital processing environment in which the present invention may be implemented.

Client computer(s)/device(s) 905 and server computer(s) 910 provide processing, storage, and input/output, and execute application programs and the like. Client computer(s)/device(s) 905 can also be linked through communications network 915 to other computing devices, including other client computer(s)/device(s) 905 and server computer(s) 910. Communications network 915 can be part of a remote access network, a global network (e.g., the Internet), a worldwide collection of computers, local area or wide area networks, gateways, and cloud computing that currently use respective protocols (TCP/IP, Bluetooth, etc.) to communicate with one another. Other electronic computer/device network architectures are suitable.

Figure 10:
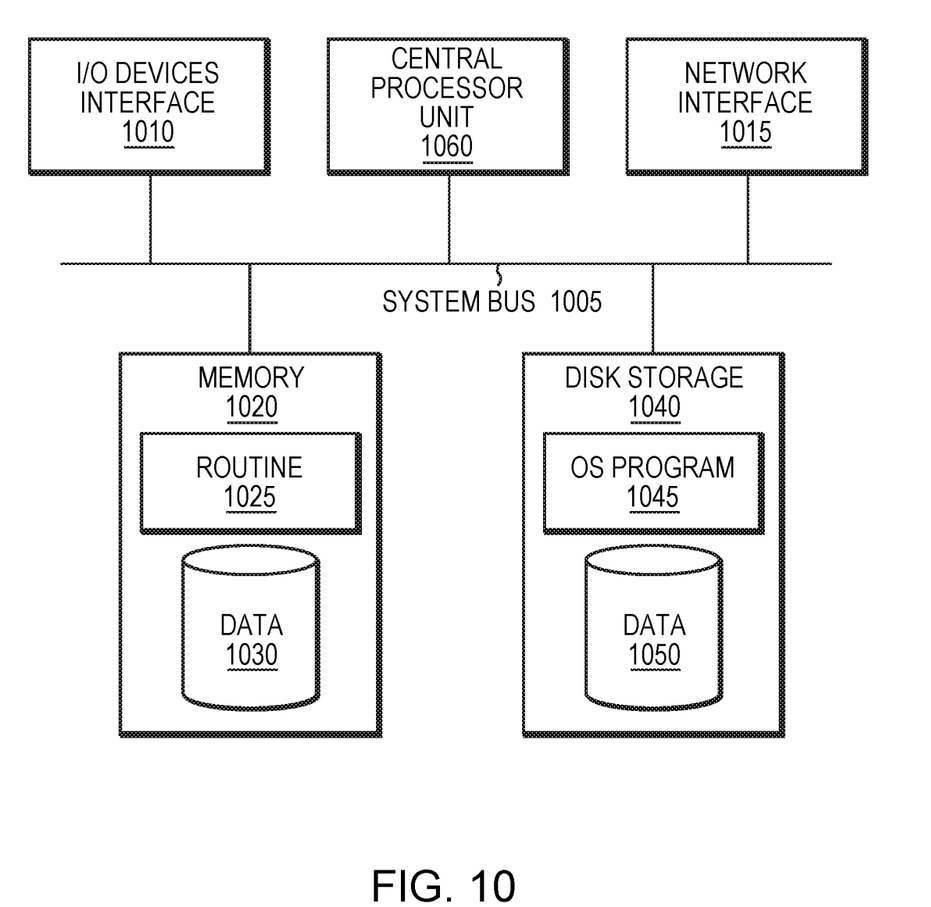
FIG. 10 is a block diagram of a computer system embodying the present invention.

FIG. 10 is a diagram of the internal structure of a computer (e.g., client computer/device 905 or a server computer 910) in the computer network of FIG. 9. Each computer 905, 910 contains system bus 1005, where a bus is a set of hardware lines used for data transfer among the components of a computer or processing system. System bus 1005 is essentially a shared conduit that connects different elements of a computer system (e.g., processor, disk storage, memory, input/output ports, network ports, etc.) and enables the transfer of information between the elements. Attached to system bus 1005 is I/O device interface 1010 for connecting various input and output devices (e.g., keyboard, mouse, displays, printers, speakers) to the computer 905, 910. Network interface 1015 allows the computer to connect to various other computer(s)/device(s) attached to a network (e.g., network 915 of FIG. 9). Memory 1020 provides volatile storage for computer software instructions 1025 and data 1030 used to implement an embodiment, such as the system of the present invention (e.g., learning assistant 102, UI dialog 303, force dialog 703, and supporting software code and data structures described herein). Disk storage 1040 provides non-volatile storage for computer software instructions 1025 and data 1030 used to implement an embodiment of the present invention. Central processor unit 1060 is also attached to system bus 1005 and provides for the execution of computer instructions.

In one embodiment, the software instructions 1025 and data 1030 are generated by a computer program product. The computer program product may include a computer readable medium such as a removable storage medium (e.g., one or more DVD-ROM's, CD-ROM's, diskettes, tapes), a memory medium, and the like. The computer program product provides at least a portion of the software instructions for the present invention. The computer program product can be installed by any suitable software installation procedure, as is well known in the art. In another embodiment, at least a portion of the software instructions may also be downloaded over a cable, communication, and/or wireless connection. In other embodiments, the software 1025 and data 1030 are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 1025.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of the computer program product is a propagation medium that the computer/device 905, 910 may receive and read, such as by receiving the propagation medium and identifying a propagated signal embodied in the propagation medium, as described above for computer program propagated signal product.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method for creating an interactive learning environment integrated with a user interface of a computer software application, the method comprising:
    creating a plurality of windows of the interactive learning environment for guiding a user through a series of steps to perform a task supported by the computer software application, wherein:
        the plurality of windows are integrated with the user interface of the computer software application and contain at least one of textual and visual content informing the user of elements to accomplish the task;
        at least one of the plurality of windows contains a pointer; and
        the pointer indicates a location of a command in the user interface of the computer software application; and
    enabling user interaction during the execution of the series of steps, wherein user interaction takes a form of a user input specified in one of the plurality of windows, and wherein execution of the series of steps includes exchanging data between a process implementing the plurality of windows of the interactive learning environment and the user interface of the computer software application, the exchanged data in the form of displaying user interface elements and user interaction data indicating the user input in the one of the plurality of windows, wherein the user interaction data automatically advances the interactive learning environment to a next step in the series of steps.

2. The computer-implemented method of claim 1, further comprising executing the command upon user selection of the command.

3. The computer-implemented method of claim 1, wherein:
    a subset of the plurality of windows is used by the computer software application when the interactive learning environment is not active; and
    using the subset of the plurality of windows while the interactive learning environment is active provides training for the use of the subset of the plurality of windows when the interactive learning environment is not active.

4. The computer-implemented method of claim 1, wherein the task is at least partially accomplished by selection of an option in a pull-down menu.

5. The computer-implemented method of claim 4, further comprising using data generated as a result of selection of the option as input to an interactive learning function causing the interactive learning environment to determine subsequent sequences of the series of steps.

6. The computer-implemented method of claim 1, wherein visual content is a video sequence demonstrating one or more user interactions to perform the task.

7. The computer-implemented method of claim 1, wherein which of the plurality of windows are displayed on a computer screen and removed from the computer screen depend on which of the series of steps is currently executing.

8. A non-transitory computer-readable data storage medium comprising instructions causing a computer to:
    create an interactive learning environment integrated with a user interface of a computer software application, the interactive learning environment comprised of a plurality of windows for guiding a user through a series of steps to perform a task supported by the computer software application, wherein:
        the plurality of windows are integrated with the user interface of the computer software application and contain at least one of textual and visual content informing the user of elements to accomplish the task;
        at least one of the plurality of windows contains a pointer; and
        the pointer indicates a location of a command in the user interface of the computer software application; and
    enable user interaction during the execution of the series of steps, wherein user interaction takes a form of a user input specified in one of the plurality of windows, and wherein execution of the series of steps includes exchanging data between a process implementing the plurality of windows of the interactive learning environment and the user interface of the computer software application, the exchanged data in the form of displaying user interface elements and user interaction data indicating the user input in the one of the plurality of windows, wherein the user interaction data automatically advances the interactive learning environment to a next step in the series of steps.

9. The computer-readable data storage medium of claim 8, further comprising executing the command upon user selection of the command.

10. The computer-readable data storage medium of claim 8, wherein:
    one or more of the plurality of windows contain a first user interface button that when selected advances a learning sequence to a next step in the series of steps; and
    one or more of the plurality of windows contain a second user interface button that when selected sets the learning sequence to a previous step in the series of steps.

11. The computer-readable data storage medium of claim 8, wherein:
    a subset of the plurality of windows is used by the computer software application when the interactive learning environment is not active; and
    using the subset of the plurality of windows while the interactive learning environment is active provides training for the use of the plurality of windows when the interactive learning environment is not active.

12. The computer-readable data storage medium of claim 8, wherein the task is at least partially accomplished by selection of an option in a pull-down menu.

13. The computer-readable data storage medium of claim 12, further comprising using data generated as a result of selection of the option as input to an interactive learning function causing the interactive learning environment to determine subsequent sequences of the series of steps.

14. The computer-readable data storage medium of claim 8, wherein visual content is a video sequence demonstrating one or more user interactions to perform the task.

15. The computer-readable data storage medium of claim 8, wherein which of the plurality of windows are displayed on a computer screen and removed from the computer screen depend on which of the series of steps is currently executing.

16. A computer system comprising:
a processor operatively coupled to a data storage system, the data storage system storing a three-dimensional model; and
a data storage memory operatively coupled to the processor and comprising instructions to configure the processor to:
create an interactive learning environment integrated with a user interface of a computer software application, the interactive learning environment comprised of a plurality of windows for guiding a user through a series of steps to perform a task supported by the computer software application, wherein:
the plurality of windows are integrated with the user interface of the computer software application and contain at least one of textual and visual content informing the user of elements to accomplish the task;
at least one of the plurality of windows contains a pointer; and
the pointer indicates a location of a command in the user interface of the computer software application; and
enable user interaction during the execution of the series of steps, wherein:
user interaction with the plurality of windows of the interactive learning environment causes the execution of a command in the computer software application upon user selection of the command in the plurality of windows of the interactive learning environment by exchanging data between a process implementing the plurality of windows of the interactive learning environment and the user interface of the computer software application, the exchanged data in the form of displaying user interface elements and user interaction data indicating the user interaction with the plurality of windows, wherein the user interaction data automatically advances the interactive learning environment to a next step in the series of steps; and
user interaction incorporates user input specified in one of the plurality of windows in the interactive learning environment.

17. The computer system of claim 16, wherein:
one or more of the plurality of windows contain a first user interface button that when selected advances a learning sequence to a next step in the series of steps; and
one or more of the plurality of windows contain a second user interface button that when selected sets the learning sequence to a previous step in the series of steps.

18. The computer system of claim 16, wherein:
a subset of the plurality of windows is used by the computer software application when the interactive learning environment is not active; and
using the subset of the plurality of windows while the interactive learning environment is active provides training for the use of the plurality of windows when the interactive learning environment is not active.

19. The computer system of claim 16, wherein the task is at least partially accomplished by selection of an option in a pull-down menu; and
further comprising using data generated as a result of selection of the option as input to an interactive learning function causing the interactive learning environment to determine subsequent sequences of the series of steps.

20. The computer system of claim 16, wherein which of the plurality of windows are displayed on a computer screen and removed from the computer screen depend on which of the series of steps is currently executing.

* * * * *